US009463413B2

(12) United States Patent
Tai et al.

(10) Patent No.: US 9,463,413 B2
(45) Date of Patent: Oct. 11, 2016

(54) HOLLOW FIBER ADSORBENT COMPRESSED DRY AIR SYSTEM

(71) Applicant: INDUSTRIAL TECHNOLOGY RESEARCH INSTITUTE, Hsinchu (TW)

(72) Inventors: Chin-Chih Tai, Hsinchu County (TW); Chien-Hung Chen, Taichung County (TW); Yun-Hsin Wang, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 73 days.

(21) Appl. No.: 14/584,833

(22) Filed: Dec. 29, 2014

(65) Prior Publication Data
US 2016/0175765 A1     Jun. 23, 2016

(30) Foreign Application Priority Data

Dec. 18, 2014 (TW) .............................. 103144288 A

(51) Int. Cl.
*B01D 53/04* (2006.01)
*B01D 53/26* (2006.01)

(52) U.S. Cl.
CPC ......... *B01D 53/261* (2013.01); *B01D 53/0438* (2013.01); *B01D 2259/402* (2013.01); *B01D 2259/40003* (2013.01); *B01D 2259/40077* (2013.01); *B01D 2259/40088* (2013.01)

(58) Field of Classification Search
CPC ............ B01D 53/261; B01D 53/0438; B01D 2259/40003; B01D 2259/40077; B01D 2259/40088; B01D 2259/402
USPC .......... 96/115, 116, 121, 134, 143, 146, 154
See application file for complete search history.

(56) References Cited

U.S. PATENT DOCUMENTS 3,335,546 A * 8/1967 Wunning ........... B01D 53/0423
                                                        95/122
3,397,511 A * 8/1968 Dwyer ................. B01D 53/261
                                                        96/144

(Continued)

FOREIGN PATENT DOCUMENTS

CN        201823452 U      5/2011
CN        102728190 A     10/2012

(Continued)

OTHER PUBLICATIONS

"Improvong Compressed Air System Performance" U.S. Department of Energy, Energy Efficiency and Renewable Energy, Nov. 2003, 128 pages.
Ahn et al., "Adsorption Dynamics of Water in Layered Bed for Air-Drying TSA Process", AIChE Journal, Jun. 2003, pp. 1601-1609, vol. 49, No. 6.

(Continued)

*Primary Examiner* — Frank Lawrence
(74) *Attorney, Agent, or Firm* — Birch, Stewart, Kolasch & Birch, LLP

(57) ABSTRACT

A hollow fiber adsorbent compressed dry air system including an intake unit, a first adsorption/regeneration unit, a second adsorption/regeneration unit, a switch unit and an exhaust unit is disclosed. The first adsorption/regeneration unit has a hollow fiber adsorbent housing and a heating device disposed in the surrounding of the adsorbent housing. The second adsorption/regeneration unit has another hollow fiber adsorbent housing and another heating device disposed in the surrounding of the another adsorbent housing. One of the hollow fiber adsorbent housings performs drying procedure to the compressed air in the room temperature, and the other hollow fiber adsorbent housing, when heated by the heating device thereof, performs a desorption regeneration procedure in a high temperature condition. The switch unit alternately switches the drying procedure and the desorption regeneration procedure to the first adsorption/regeneration unit and the second adsorption/regeneration unit. The exhaust unit outputs dried product air.

18 Claims, 5 Drawing Sheets

(56) References Cited

U.S. PATENT DOCUMENTS

| | | | | |
|---|---|---|---|---|
| 4,127,395 A * | 11/1978 | McKey | ............... | B01D 53/261 95/10 |
| 5,906,674 A * | 5/1999 | Tan | ............... | B01D 53/04 95/101 |
| 5,951,744 A * | 9/1999 | Rohrbach | ............ | B01J 20/28023 261/104 |
| 6,370,887 B1 | 4/2002 | Hachimaki | | |
| 6,887,303 B2 | 5/2005 | Hesse et al. | | |
| 7,368,000 B2 * | 5/2008 | Jain | ............... | B01D 53/025 95/127 |
| 2008/0314244 A1 * | 12/2008 | Kelley | ............... | B01D 53/02 95/41 |
| 2010/0251891 A1 | 10/2010 | Billiet | | |
| 2011/0011803 A1 * | 1/2011 | Koros | ............... | B01D 53/02 210/670 |
| 2013/0061756 A1 | 3/2013 | Hung et al. | | |
| 2014/0020560 A1 | 1/2014 | Perera et al. | | |

FOREIGN PATENT DOCUMENTS

| | | |
|---|---|---|
| CN | 103920374 A | 7/2014 |
| JP | 2003-57389 A | 2/2003 |
| TW | 201424826 A | 7/2014 |
| TW | I480496 B | 4/2015 |

OTHER PUBLICATIONS

Eicker et al., "Experimental investigations on desiccant wheels", Applied Thermal Engineering, 2012, pp. 71-80, vol. 42.

Golubovic et al., "Sorption properties for different types of molecular sieve and their influence on optimum dehumidification performance of desiccant wheels", International Journal of Heat and Mass Transfer, Mar. 11, 2006, pp. 2802-2809, vol. 49.

Jones et al., "Adsorbent Materials for Carbon Dioxide Capture from Large Anthropogenic Point Sources", ChemSusChem, 2009, pp. 796-854, vol. 2.

Ribeiro et al., "Adsorption Equilibrium and Kinetics of Water Vapor on Different Adsorbents", American Chemical Society, Ind. Eng. Chem. Res., 2008, pp. 7019-7026, vol. 47, No. 18.

Su et al., "CO2 capture from gas stream by zeolite 13X using a dual-column temperature/vacuum swing adsorption", Energy Environ. Sci., The Royal Society of Chemistry, 2012, pp. 9021-9027, vol. 5.

Tai et al., "Development of Adsorbent Hollow Fibres for Environmental Applications", Adsorption Science & Technology, 2013, pp. 85-97, vol. 31, No. 11.

Wang et al., "Adsorption Equilibrium of Carbon Dioxide and Water Vapor on Zeolites 5A and 13X abd Silica Gel: Pure Components", American Chemical Society, Journal of Chemical & Engineering Data, 2009, pp. 2839-2844, vol. 54, No. 10.

* cited by examiner

HOLLOW FIBER ADSORBENT COMPRESSED DRY AIR SYSTEM

This application claims the benefit of Taiwan application Serial No. 103144288, filed Dec. 18, 2014, the disclosure of which is incorporated by reference herein in its entirety.

TECHNICAL FIELD

The disclosure relates in general to a compressed dry air system, and more particularly to a compressed dry air system whose adsorbent material is formed of hollow fibers.

BACKGROUND

Conventional industries and high-technology manufacturing processes have strict requirement regarding the quality of the compressed air, that is, dewpoint ≤−70° C., dust size ≤0.1 μm, and oil content ≤0.01 mg/m³. To meet the above quality requirements of the compressed air, the engineering system needs to be equipped with several related equipment such as filtering equipment and cleaning equipment for purifying the compressed air.

According to the conventional drying process of the compressed air, firstly, the compressed air is de-humidified by a refrigerant dryer for reducing the dewpoint to be around 2° C. Then, the compressed air is further processed by an adsorbent dryer for reducing the dewpoint of the air to be between −40~−70° C. During a dehydration procedure, both the refrigerant dryer and the adsorbent dryer have an air loss. During a cyclic regeneration procedure, the adsorbent dryer has an air loss rate of 5~20%. Moreover, the existing specification of operating pressure is set to be between 7~10 kg/cm², and the energy consumption of the dryer is proportional to the operating pressure. That is, the higher the operating pressure, the worse the energy consumption. To summarize, once the air loss and energy conversion efficiency are resolved during the drying procedure of the compressed air, energy consumption will be reduced. Therefore, it is essential to reduce unnecessary energy loss during the drying procedure of the compressed air.

SUMMARY

The disclosure is directed to a hollow fiber adsorbent compressed dry air system. By using the advantage of low mass transfer resistance of the hollow fiber adsorbent material, the system alternately performs room-temperature adsorption at a relatively low pressure and low-temperature regeneration with low air consumption to dry the compressed air and reduce energy loss.

According to one embodiment of the disclosure, a hollow fiber adsorbent compressed dry air system including an intake unit, a first adsorption/regeneration unit, a second adsorption/regeneration unit, a switch unit and an exhaust unit is disclosed. The first adsorption/regeneration unit has a hollow fiber adsorbent housing and a heating device disposed in the surrounding of the adsorbent housing. The second adsorption/regeneration unit has another hollow fiber adsorbent housing and another heating device disposed in the surrounding of the another adsorbent housing. One of the hollow fiber adsorbent housings performs a drying procedure to the compressed air in the room temperature, the other hollow fiber adsorbent housing, when heated by the other heating device thereof, performs a desorption regeneration procedure in a high temperature condition. The switch unit alternately switches the drying procedure and the desorption regeneration procedure to the first adsorption/regeneration unit and the second adsorption/regeneration unit. The exhaust unit outputs dried product air.

The above and other aspects of the disclosure will become better understood with regard to the following detailed description of the preferred but non-limiting embodiment(s). The following description is made with reference to the accompanying drawings.

Figure 1A:
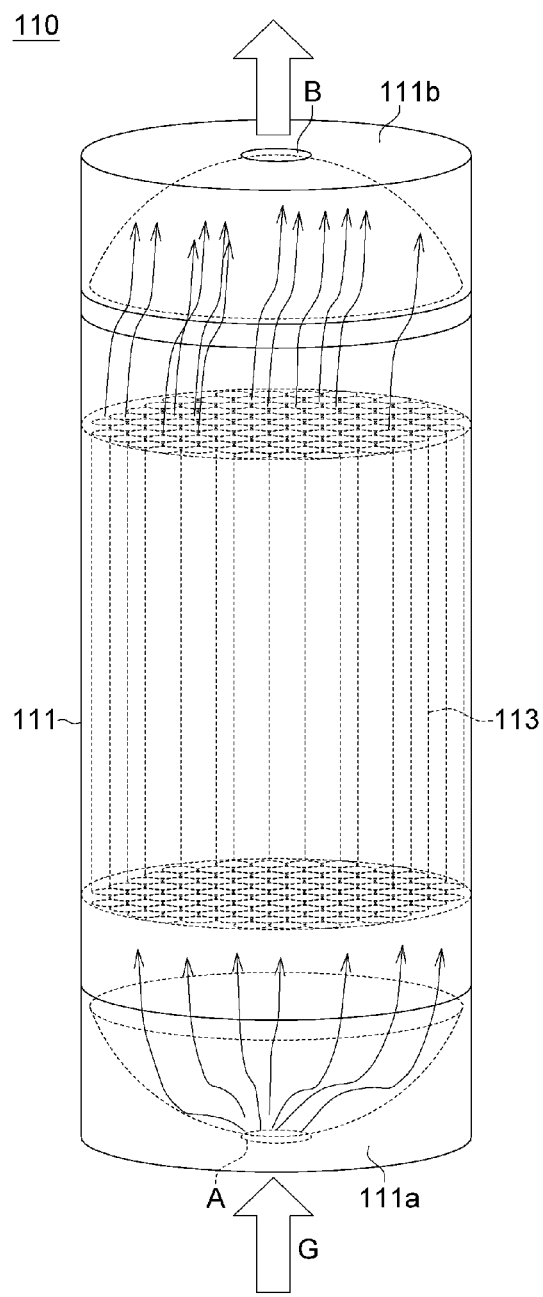
FIGS. 1A and 1B respectively illustrate a hollow fiber adsorbent housing and a single hollow fiber thereof used in a compressed dry air system of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

In an exemplary example of the disclosure, a hollow fiber adsorbent compressed dry air system is disclosed. A heating device is used for enabling the hollow fiber adsorbent material to desorb and regenerate in a high temperature condition to avoid air loss. In comparison to the conventional pressure swing adsorption (PSA) dryer which incurs a loss rate about 5~20% of the product air during the regeneration procedure, the compressed dry air system of the present embodiment employs heating (such as electric heating) regeneration which incurs a loss rate less than about 4% of the air, and effectively reduces energy loss. In an exemplary example of the disclosure, the conventional particle adsorbent material is replaced with the hollow fiber adsorbent material, such that the compressed dry air system of the disclosure avoids the problems arising from the conventional adsorbent dryer using granular adsorbent material (pellet or bead), and significantly improves the performance in respect of adsorption efficiency, air quality and low energy consumption. In the present disclosure, the hollow fiber adsorbent material replaces inorganic adhesive with polymers, and possesses a dendritic porous structure and a high specific surface area (such as between 2500~3500 m²/m³). The porous adsorbent material used in conventional granular packed column is formed of such as activated carbon, zeolite or silica gel. The porous adsorbent material has low specific surface area (below 2500 m²/m³) and low adsorption/desorption rate. The efficiency and performance of the packed column is inferior to that of the hollow fiber adsorbent material.

Furthermore, the adsorbent solid-content of the hollow fiber adsorbent material can be higher than 90% and maintain the flexibility feature of polymers. In the porous structure formed of polymers, the adsorbent material has very low adsorption resistance, and the adsorption/desorption rate is 2 or 3 times higher than that of the conventional particle adsorbent material (such as spherical, cylindrical or honeycombed shape). Therefore, the desorption regeneration effect can be quickly achieved in the low-pressure swing, low-vacuum swing or low-thermal swing condition. Also, during the regeneration process, the adsorbent housing of the present embodiment avoids the adsorbent material being secondarily polluted by moisture because the elution airflow path of each hollow fiber is shorter than that of the conventional particle packed adsorption column. Also, the airflow direction inside the adsorbent housing is parallel to that of the hollow fiber, the hollow fiber adsorbent material has low mass transfer resistance and the low-pressure drop of the hollow fiber adsorbent material is more than 100 times lower than that of the conventional packed adsorption column. Therefore, if the hollow fibers are used as adsorbent material, the size of the conventional packed adsorption column (adsorption bed) can be greatly reduced, and the dusting problem of the adsorbent material can be avoided.

The hollow fiber possesses high performance of adsorption/desorption and operates at a lower operating pressure lower than 5 kg/cm$^2$ (the operating pressure of the dryer currently available in the market is between 7~10 kg/cm$^2$). Thus, there is no need to dispose a refrigerant drying device at the front end to reduce the dewpoint of the compressed air. Therefore, the adsorbent compressed dry air system mainly formed of hollow fiber adsorbent material can produce compressed air having low dewpoint (<−40~−70° C.) for its downstream users. The performance of the hollow fiber adsorbent compressed dry air system completely replaces the conventional compressed air process (the refrigerant dryer cooperating with the conventional adsorbent dryer), not only reducing the operating cost of the refrigerant drying device but also reducing the pressure loss arising from serial connection of the equipment. Therefore, low operating pressure (which means low energy consumption) marks the largest competitive advantage of the hollow fiber compressed dry air system of the present disclosure.

A number of embodiments are disclosed below for elaborating the disclosure. However, the embodiments of the disclosure are exemplary and explanatory only, not for limiting the scope of protection of the disclosure.

Figure 1B:
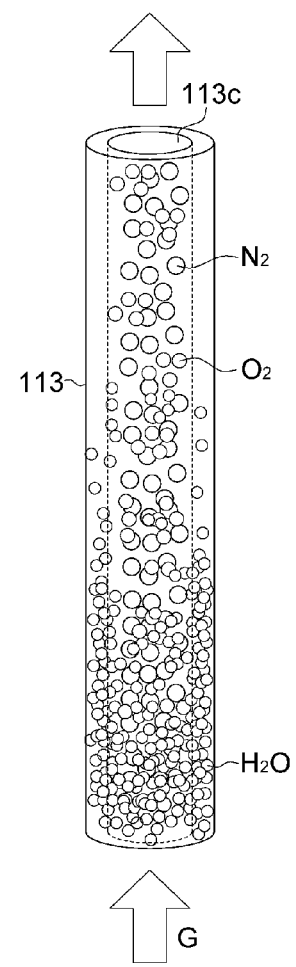

Referring to FIGS. 1A and 1B, schematic diagrams of a hollow fiber adsorbent housing 111 and hollow fibers 113 thereof respectively used in a compressed dry air system of the disclosure are shown. The hollow fiber adsorbent housing 111 includes an entrance 111a, an exit 111b and a plurality of hollow fibers 113 arranged in parallel between the entrance 111a and the exit 111b. The hollow fibers 113 can be porous material formed by a spinning process. During the hollow fiber spinning process, a suitable organic solvent (such as N-Methyl-2-pyrrolidone (NMP)), a polymer material (such as polysulfone (PSF)), and a molecular sieve material (such as 3A, 4A, 5A, 13X, activated alumina oxide, aerogel and mesoporous silica) are uniformly mixed, and a spinning dope will be completed after the mixture is stirred for 1 to 3 days. Then, the spinning dope is degased and placed to a stainless pressure tank and left for about 10~30 minutes. Then, the hollow fiber spinning process can be performed when no bubbles are occurred.

Then, the hollow fibers 113 manufactured by the spinning process are cut according to a suitable length, and a suitable number of hollow fibers 113 are bundled and placed to a pressure container (such as an aluminum housing) whose shape can be cylindrical, cuboidal or cubic. The hollow fibers 113 can be separated from the entrance A and the exit B at the two ends of the hollow fiber adsorbent housing 111 by suitable intervals for the diffusion of airflow (as indicated in FIG. 1A). Thus, the compressed air G has a sufficient buffer area enabling the entire hollow fibers 113 to be uniformly eluted by the compressed air G and the hollow fibers 113 can thus be fully utilized.

Furthermore, the front and rear gaps between the ends of the hollow fibers 113 can be sealed by a heat resisting silicone, and so can the gaps between the hollow fibers 113 and the sidewalls of the container be sealed by the heat resisting silicone. Thus, the adsorbent housing merely uses the hollow cylindrical space inside the hollow fibers as airflow channels. When the compressed air with moisture passes through the central channels 113c of the hollow fibers 113 along the axial direction, water molecules will be quickly attracted and adsorbed by the hollow fiber adsorbent material due to molecular diffusion, concentration difference and hollow fiber structure. The adsorption distribution of water molecules ($H_2O$), oxygen ($O_2$) and nitrogen ($N_2$) in the hollow fibers 113 along the main flow direction of the compressed air G is illustrated in FIG. 1B.

Figure 2A:
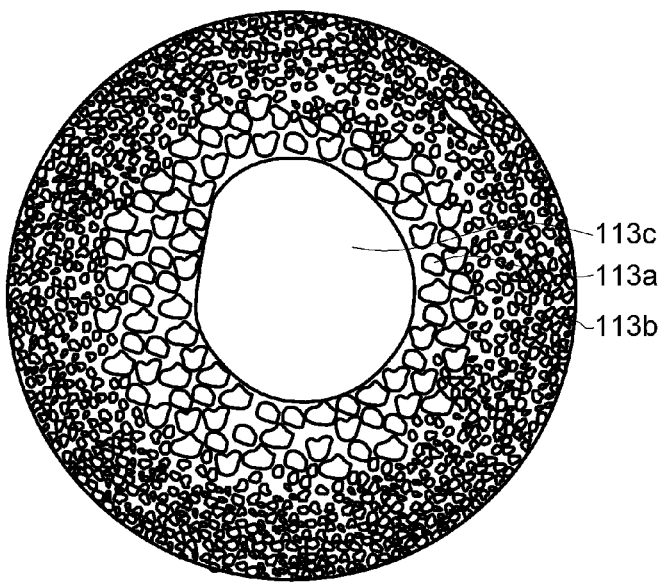
FIG. 2A illustrates an enlarged cross-sectional view of a hollow fiber.
Figure 2B:
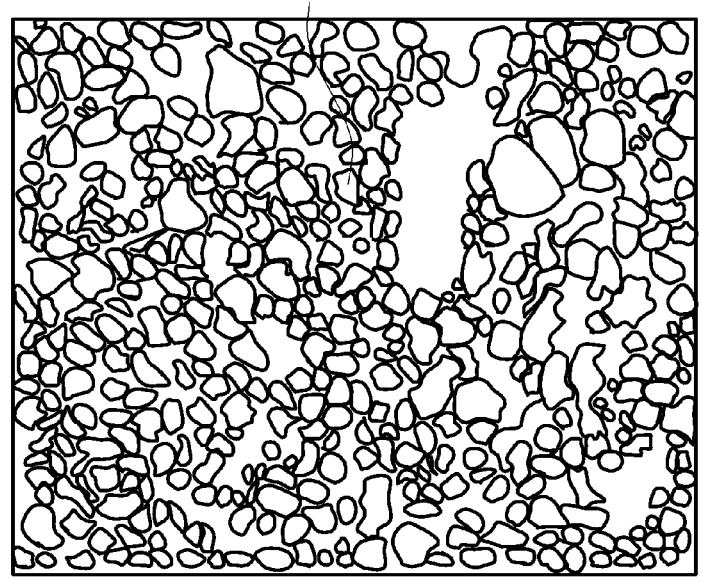
FIG. 2B illustrates an enlarged view of the inner structure of FIG. 2A.

In an embodiment, the hollow fibers 113 can be a single- or multi-layered structure. Referring to FIG. 2A, an enlarged cross-sectional view of a hollow fiber 113 is shown. The inner structure 113a of the hollow fiber 113 is formed of interwoven long fibers with higher porosity, and the outer structure 113b of the hollow fibers 113 is formed of interwoven short fibers with lower porosity and more compact, such that the two-layered hollow fiber possesses superior mechanical strength. Meanwhile, the special porous structure enables air to easily reach the adsorption site of the hollow fiber adsorbent material to enhance the adsorption ability. Referring to FIG. 2B, an enlarged view of the inner structure of FIG. 2A is shown. FIG. 2B shows the distribution of molecular sieves (such as 13X). The molecular sieve powders M, may uniformly be distributed over the structure of interwoven hollow fibers, are not covered by polymers and therefore maintains the adsorption feature of the molecular sieve powders M.

Figure 3:
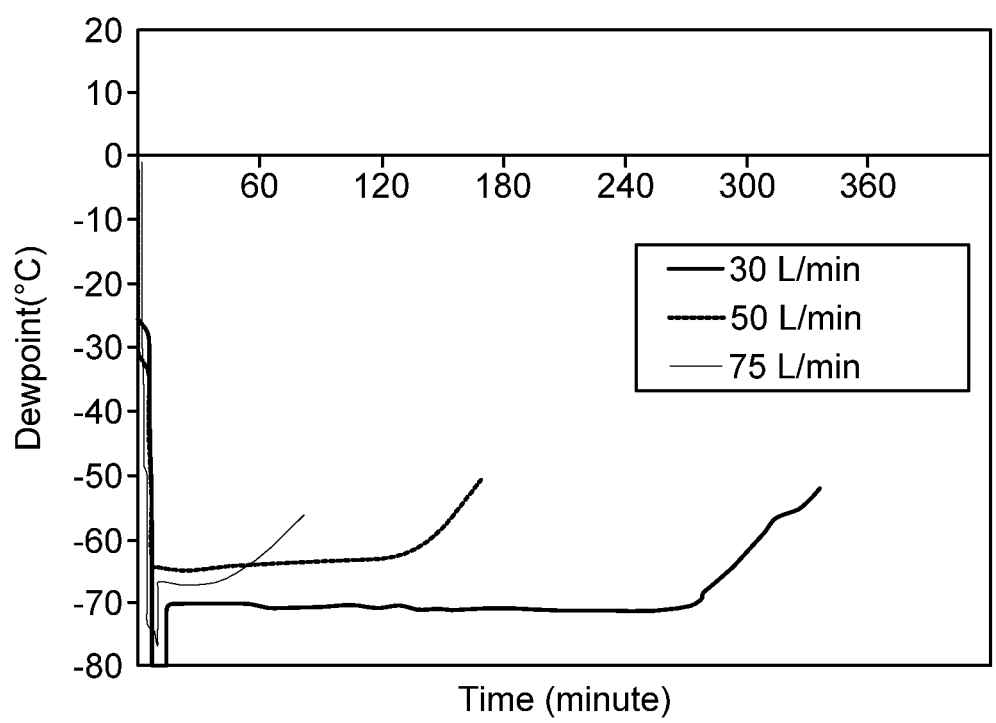
FIG. 3 illustrates a comparison of adsorption breakthrough curves of the moisture adsorbed by the hollow fiber adsorbent housing under different processing flows.

Since the hollow fibers 113 have low mass transfer resistance, the operating pressure can be reduced to 5 kg/cm$^2$ or less. Besides, each hollow fiber 113 have a central channel 113c, and the flow of the compressed air G can be adjusted in a suitable operating pressure. The preferred flow is between about 30~75 L/min, such that the exit dewpoint can maintain at a predetermined value. Referring to FIG. 3, a comparison of adsorption breakthrough curves of the moisture adsorbed by the hollow fiber adsorbent housing under different processing flows is shown. The exit dewpoints of single hollow fiber adsorbent housing are below −60° C. in 3 different processing flow rates of 30, 50, 75 L/min respectively. The faster the processing flow rate, the shorter the break-through time. Conversely, the slower the processing flow rate, the longer the break-through time. As indicated in FIG. 3, when the processing flow rate is 30 L/min, the column has the best adsorption performance and the break-through time is the longest; when the processing flow rate is 75 L/min, the column has inferior adsorption performance and the break-through time is shorter.

Figure 4:
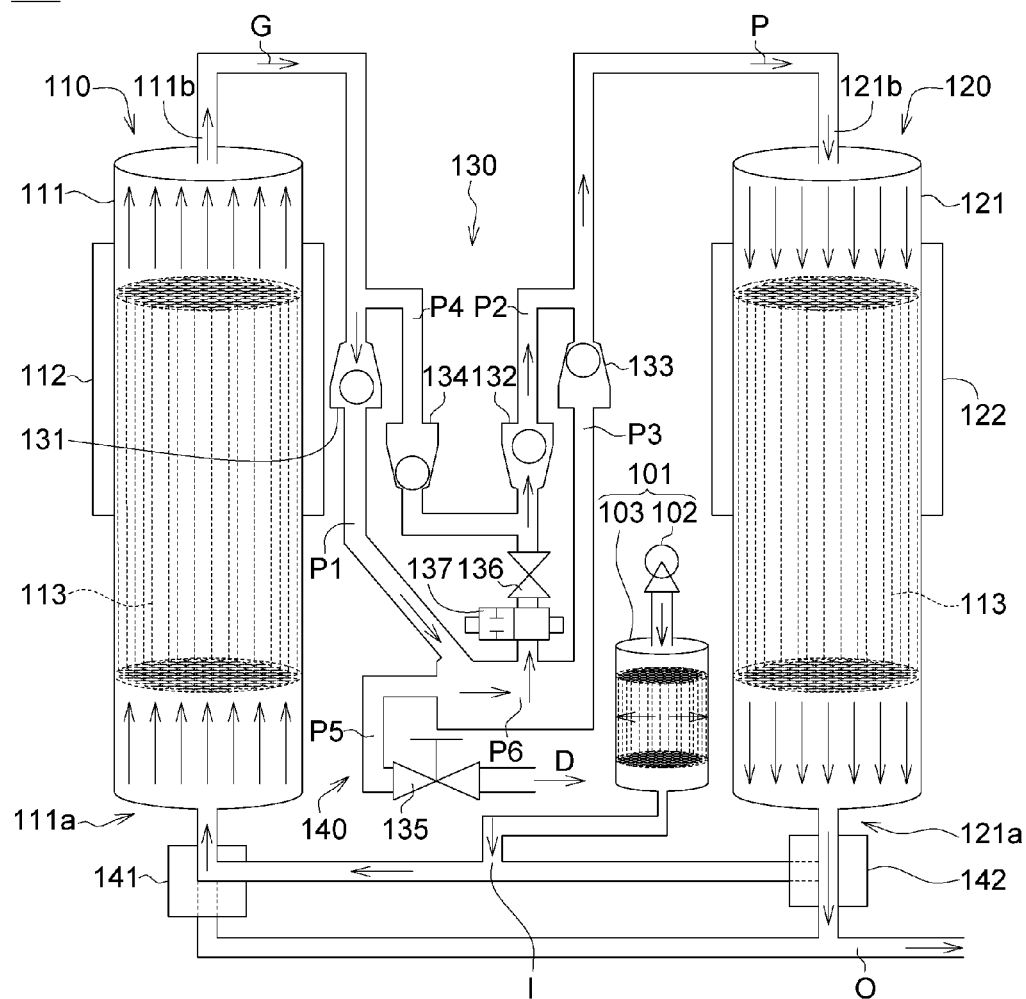
FIG. 4 illustrates a hollow fiber adsorbent compressed dry air system according to an embodiment of the disclosure.

Referring to FIG. 4, a hollow fiber adsorbent compressed dry air system 100 according to an embodiment of the disclosure is shown. The hollow fiber adsorbent compressed dry air system 100 includes an intake unit 101, a first adsorption/regeneration unit 110, a second adsorption/regeneration unit 120, a switch unit 130 and an exhaust unit 140. The intake unit 101 provides a compressed air G. The first adsorption/regeneration unit 110 has a hollow fiber adsorbent housing 111 and a heating device 112 disposed in the surrounding of the adsorbent housing 111. The second adsorption/regeneration unit 120 has another hollow fiber adsorbent housing 121 and another heating device 122 disposed in the surrounding of the adsorbent housing 121. One of the two hollow fiber adsorbent housings 111 and 121 performs a drying procedure to the compressed air in the room temperature, and the other one of the two hollow fiber adsorbent housings 111 and 121, when heated by the heating device thereof, performs a desorption regeneration procedure in a high temperature condition. The switch unit 130 alternately switches the drying procedure and the regeneration procedure to the first adsorption/regeneration unit 110 and the second adsorption/regeneration unit 120. The exhaust unit 140 outputs dried product air D.

To summarize, the intake unit 101 of the present system includes an air supply unit 102 and a hollow fiber filtering unit 103. When the compressed air G provided by air supply unit 102, such as an air compressor, is transferred to the hollow fiber filtering unit 103, the hollow fiber adsorbent material of the hollow fiber filtering unit 103 filters the dust and oil mist off the compressed air G to avoid the hollow fibers 113 used for drying the compressed air being polluted.

As indicated in FIG. 4, the compressed air entering the hollow fiber filtering unit 103 is filtered when passing through the pipe wall of the hollow fiber adsorbent material of the hollow fiber filtering unit 103 in a horizontal airflow trend inside out (or outside in) and the quality of the compressed air can thus be enhanced.

Besides, the heating devices 112 and 122 of the present system can employ a flex type or a fixed type heater (such as heating belt, heating pack or heating plate), use a temperature sensing rod to monitor the heating temperature, and send the signal back to the controller to precisely control the predetermined heating temperature (such as 200° C.) and avoid unnecessary energy loss. As indicated in FIG. 4, the two heating devices 112 are used alternately. That is, when the first adsorption/regeneration unit 110 performs a regeneration procedure, the first adsorption/regeneration unit 110 is heated by the heating device 112 disposed in the surrounding thereof; when the first adsorption/regeneration unit 110 performs a drying procedure, the first adsorption/regeneration unit 110 is not heated by the heating device 112 disposed in the surrounding thereof and maintains at room temperature. Likewise, when the second adsorption/regeneration unit 120 performs the regeneration procedure, the second adsorption/regeneration unit 120 is heated by the heating device 122 disposed in the surrounding thereof; when the second adsorption/regeneration unit 120 performs the drying procedure, the second adsorption/regeneration unit 120 is not heated by the heating device 112 disposed in the surrounding thereof and maintains at room temperature.

The heating devices 112 and 122 can partially cover the heating regions at respective entrance of the regeneration/elution airflow, and 4% of the dried product air is used as the elution airflow and the heat of the heating region to the hollow fiber adsorbent housing is transferred to perform a desorption regeneration procedure. The above design saves energy loss during the regeneration procedure. During the cooling stage, the heating devices 112 and 122 can adopt an external air cooling approach to accelerate cooling and shorten the waiting time, so that one of the regenerated hollow fiber adsorbent housings can be quickly cooled down to 40° C. or even lower and the compressed air can be dried again. The present system adopts the external air cooling approach to reduce the temperature of the hollow fiber adsorbent housing. Actual measurement shows that the cooling time of the present system saves ⅓ cooling time compared to natural cooling, and the switch time of adsorption/desorption between the two hollow fiber adsorbent housings 111 and 121 can be more flexibly adjusted.

Moreover, the two hollow fiber adsorbent housings 111 and 121 are separated by a thermal insulator (not illustrated), such that when one of the hollow fiber adsorbent housings is heated during the regeneration procedure, the radiation heat will not interfere with the other hollow fiber adsorbent housing performing the drying procedure. Also, when one of the hollow fiber adsorbent housings is cooled down, the present system can use a cooling fan to attract external air to generate a forced convection to dissipate extra heat. Likewise, when one of the hollow fiber adsorbent housings performs the drying procedure to the compressed air, the present system can use the cooling fan to dissipate the adsorption heat generated when the hollow fibers absorb moisture and the heat generated when the compressed air elutes the hollow fiber adsorbent housing.

Refer to FIG. 4. The present system uses two hollow fiber adsorbent housings 111 and 121 to perform different procedures and use the switch unit 130 to alternately switch the two hollow fiber adsorbent housings 111 and 121 to meet the requirement of continuously supplying a dry compressed air whose dewpoint is between −40~−70° C. As indicated by the direction of the arrow of FIG. 4, the compressed air G upwardly enters the hollow fiber adsorbent housing 111 to perform the drying procedure, and the other hollow fiber adsorbent housing 121 performs the heating/regeneration procedure. The regeneration/elution airflow P, arising from a minor proportion of the dried compressed air that is bypassed to the regeneration end, flows in a top-down direction. The advantage is that the regeneration/elution airflow P flows in a direction opposite to the direction of the airflow during the drying procedure, hence avoiding the moisture desorbed during the regeneration procedure again polluting the blocks not to adsorb in the hollow fiber adsorbent housing. The other advantage is that since the regeneration/elution airflow P carries a high concentration of moisture from desorption procedure, when the high temperature airflow flows off the room temperature region via the heating region of the hollow fiber adsorbent housing, the temperature of the elution airflow is suddenly reduced, part of the moisture will condense to the liquid state, and the water generated from the desorption procedure will be discharged off the system.

Refer to FIG. 4. The switch unit 130 of the present system includes an airflow direction control module and a controller. The controller controls the compressed air to enter the two hollow fiber adsorbent housings 111 and 121 via the airflow direction control module in a forward or a reverse direction. The controller includes a set of electromagnetic valves 141 and 142 respectively disposed at the entrances of the hollow fiber adsorbent housings 111 and 121. The two electromagnetic valves 141 and 142 alternately control the compressed air to enter the system via one of the entrances 111a/121a of the hollow fiber adsorbent housings 111/121 and leave the system via the other of the entrances 111a/121a of the hollow fiber adsorbent housings 111/121.

In short, during the forward operation, the airflow direction control module has a first manifold P1 connecting the exit 111b of the hollow fiber adsorbent housing 111 disposed at the left-hand side and a second manifold P2 connecting the exit 121b of the other hollow fiber adsorbent housing 121, and the airflow direction control module has a check valve 131 disposed on the first manifold P1 and a check valve 132 disposed on the second manifold P2. When the compressed air G flows to the second manifold P2 via the first manifold P1, the two check valves 131 and 132 are opened for the compressed air G to pass through.

Besides, during the reverse operation (not illustrated), the airflow direction control module has a third manifold P3 connecting the exit 121b of the hollow fiber adsorbent housing 121 disposed at the right-hand side and a fourth manifold P4 connecting the exit 111b of the other hollow fiber adsorbent housing 111, the airflow direction control module has a check valve 133 disposed on the third manifold P3 and a check valve 134 disposed on the fourth manifold P4. When the compressed air G flows to the fourth manifold P4 via the third manifold P3, the two check valves 133 and 134 are opened for the compressed air G to pass through.

Moreover, the exhaust unit 140, located between the two hollow fiber adsorbent housings 111 and 121, includes a backpressure regulating valve 135 disposed on a dry compressed air exit pipe P5 for adjusting the exit pressure of the dried product air D. The dry compressed air exit pipe P5 is connected to an intersection pipe P6. The controller includes a bypass regulating valve 136 disposed on the intersection pipe P6 for adjusting the bypassed pressure. The intersection pipe P6 connects with the first manifold P1, the second manifold P2, the third manifold P3, the fourth manifold P4 and the dry compressed air exit pipe P5.

Suppose the hollow fiber adsorbent housing 111 disposed at the left-hand side performs the drying procedure and the hollow fiber adsorbent housing 121 disposed at the right-hand side performs the desorption regeneration procedure. After the compressed air entered the system via the entrance I and further entered the hollow fiber adsorbent housing 111 disposed at the left-hand side via the three-way electromagnetic valves 141 to perform the drying procedure, the dried compressed air G is effused from the exit 111b of the hollow fiber adsorbent housing 111 and then passes through the check valve 131 (but not the check valve 134) to reach the intersection pipe P6 and lastly outputs a compressed air whose dewpoint is between −40~−70° C. via the backpressure regulating valve 135. Part of the dried compressed air G can enter the hollow fiber adsorbent housing 121 disposed at the right-hand side via the check valve 132 (but not the check valves 133 and 134 because the fluid pressure at the other end is greater than the channel pressure) to perform the regeneration/elution procedure. Lastly, the elution airflow P carrying the moisture generated from the desorption procedure is discharged via the three-way electromagnetic valves 142 and the exit O. To the contrary, when the system switches the adsorption/desorption procedure to perform the reverse operation, the fluid direction is opposite and symmetric with that of the above fluid.

In an embodiment, the bypass regulating valve 136 disposed on intersection pipe P6 controls the volume of the elution airflow during regeneration. The bypass regulating valve 136 can be a mechanical throttle. Besides, the present system can further use a timing control valve 137 to control the on/off state of the elution airflow so as to activate airflow elution at suitable timing. Therefore, the timing control valve 137 can programmably control the regeneration/elution time to effectively reduce energy consumption of the dried product air. In another embodiment, the timing control valve 137 and the bypass regulating valve 136 can be integrated as one electronic throttle having the function of timing control and bypass adjustment.

Figure 5:
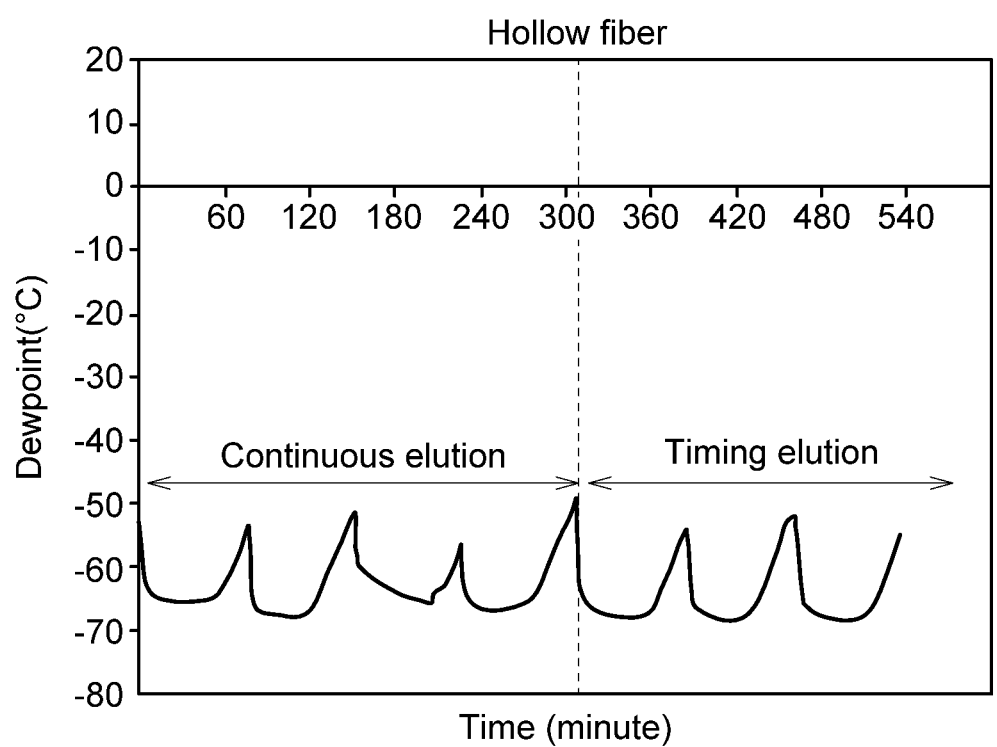
FIG. 5 illustrates a comparison chart of dewpoint at the exit of the compressed dry air system between different elution programs over a long period of operation.

Referring to FIG. 5, a comparison chart of dewpoint at the exit of the hollow fibers between continuous elution and timing elution is shown. The adsorbent material of the conventional dryer is particle type and is difficult to absorb and desorb, and hence needs a large volume of elution airflow to continuously perform desorption/elution. The adsorbent material of the drying system of the disclosure is formed of hollow fibers and has the feature of easy adsorption and desorption. Therefore, the dry air system of the disclosure can adopt timing elution to effectively reduce the energy loss for the dried gas. The dewpoint values of the hollow fiber adsorption characteristic curves of FIG. 5 show no significant difference between continuous elution and timing elution. Therefore, it can be concluded that the timing elution of the present system does not affect the overall drying performance.

Experimental data show that the compressed dry air system of the present embodiment does not need to install a refrigerant dryer at the front end. Instead, the compressed dry air system of the present embodiment only needs to connect the source of the compressed air to the entrance of the present system. The actual operating pressure is 5 kg/cm$^2$ (the operating pressure of the dryer currently available in the market is between 7~10 kg/cm$^2$), the regeneration temperature is set to be 200° C., and the cyclic switching time is 75 minutes. Following the drying procedure, the present dry air system can continuously output a dry compressed air with low dewpoint, the dewpoint of the compressed air can reach −80° C., and the average dewpoint is about −70° C. The performance of the present dry air system is significantly superior to that of the conventional dryer.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A hollow fiber adsorbent compressed dry air system, comprising:
    an intake unit for providing a compressed air;
    a first adsorption/regeneration unit having a hollow fiber adsorbent housing and a heating device disposed in the surrounding of the adsorbent housing;
    a second adsorption/regeneration unit having another hollow fiber adsorbent housing and another heating device disposed in the surrounding of the another adsorbent housing, wherein one of the hollow fiber adsorbent housings performs a drying procedure to the compressed air in the room temperature, and the other hollow fiber adsorbent housing, when heated by the other heating device thereof, performs a desorption regeneration procedure using a dried product air from the compressed air as an elution airflow in a high temperature condition;
    a switch unit for alternately switching the drying procedure and the desorption regeneration procedure to the first adsorption/regeneration unit and the second adsorption/regeneration unit; and
    an exhaust unit for outputting the dried product air.

2. The hollow fiber adsorbent compressed dry air system according to claim 1, wherein the compressed air has an operating pressure below 5 kg/cm$^2$.

3. The hollow fiber adsorbent compressed dry air system according to claim 1, wherein each of the two hollow fiber adsorbent housings has a plurality of hollow fibers arranged in parallel along an axial direction, and the compressed air passes through the hollow fibers via central channels of the hollow fibers along the axial direction.

4. The hollow fiber adsorbent compressed dry air system according to claim 3, wherein the surface area of the hollow fibers is between 2500~3500 $m^2/m^3$.

5. The hollow fiber adsorbent compressed dry air system according to claim 3, wherein the hollow fibers are a single-layered or multi-layered structure, and when the hollow fibers are a two-layered structure, the inner structure has a porosity greater than a porosity of the outer structure.

6. The hollow fiber adsorbent compressed dry air system according to claim 1, wherein the intake unit comprises an air supply unit and a hollow fiber filtering unit, the compressed air provided by the air supply unit is transferred to the hollow fiber filtering unit, and the compressed air, being an airflow moving inwardly or outwardly, further passes through pipe walls of hollow fiber adsorbent material of the hollow fiber filtering unit for filtering.

7. The hollow fiber adsorbent compressed dry air system according to claim 1, wherein the two heating devices partially cover a heating region of the two hollow fiber adsorbent housings, and further transfer the heat of the heating region to one of the hollow fiber adsorbent housings for performing the desorption regeneration procedure.

8. The hollow fiber adsorbent compressed dry air system according to claim 7, wherein one of the hollow fiber adsorbent housings is cooled by an external air after performing the desorption regeneration procedure.

9. The hollow fiber adsorbent compressed dry air system according to claim 1, wherein the compressed air upwardly enters one of the hollow fiber adsorbent housings to perform the drying procedure, and then downwardly enters the other hollow fiber adsorbent housing to perform the desorption regeneration procedure.

10. The hollow fiber adsorbent compressed dry air system according to claim 1, wherein the switch unit comprises an airflow direction control module and a controller, which controls the compressed air to enter the two hollow fiber adsorbent housings via the airflow direction control module in a forward or reverse direction.

11. The hollow fiber adsorbent compressed dry air system according to claim 10, wherein the controller comprises an electromagnetic valve set respectively disposed at an entrance of one of the hollow fiber adsorbent housings and an entrance of the other hollow fiber adsorbent housing for controlling the compressed air to alternately enter via the entrance of one of the hollow fiber adsorbent housings and leave via the entrance of the other hollow fiber adsorbent housing.

12. The hollow fiber adsorbent compressed dry air system according to claim 10, wherein during forward operation, the airflow direction control module has a first manifold connecting an exit of one of the hollow fiber adsorbent housings and a second manifold connecting an exit of the other hollow fiber adsorbent housing, the airflow direction control module has a check valve disposed on the first manifold and a check valve disposed on the second manifold, and the two check valves are opened when the compressed air flows to the second manifold via the first manifold.

13. The hollow fiber adsorbent compressed dry air system according to claim 12, wherein during the reverse operation, the airflow direction control module has a third manifold connecting the exit of one of the hollow fiber adsorbent housings and a fourth manifold connecting the exit of another hollow fiber adsorbent housing, and the airflow direction control module has a check valve disposed on the third manifold and a check valve disposed on the fourth manifold, and when the compressed air flows to the fourth manifold via the third manifold, the two check valves on the third and fourth manifolds are opened.

14. The hollow fiber adsorbent compressed dry air system according to claim 13, wherein the controller comprises a bypass regulating valve disposed on an intersection pipe, which connects with the first manifold, the second manifold, the third manifold, the fourth manifold and the exhaust unit.

15. The hollow fiber adsorbent compressed dry air system according to claim 14, wherein the exhaust unit comprises a backpressure regulating valve disposed on a dry compressed air exit pipe connected to the intersection pipe.

16. The hollow fiber adsorbent compressed dry air system according to claim 14, wherein part of the compressed air is bypassed by the bypass regulating valve to perform the desorption regeneration procedure.

17. The hollow fiber adsorbent compressed dry air system according to claim 16, wherein the controller further comprises a timing control valve disposed on the intersection pipe for programmably controlling the time of regeneration/elution.

18. The hollow fiber adsorbent compressed dry air system according to claim 17, wherein the timing control valve and the bypass regulating valve are combined as an electronic throttle.

* * * * *